(12) United States Patent
Lisiecki

(10) Patent No.: US 11,039,630 B2
(45) Date of Patent: *Jun. 22, 2021

(54) GAS INFUSION MODULE

(71) Applicant: Micro Matic USA, INC., Brooksville, FL (US)

(72) Inventor: Joseph Lisiecki, Spring Hill, FL (US)

(73) Assignee: MICRO MATIC USA, INC., Brooksville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/678,237

(22) Filed: Nov. 8, 2019

(65) Prior Publication Data

US 2020/0068923 A1 Mar. 5, 2020

Related U.S. Application Data

(63) Continuation of application No. 16/386,062, filed on Apr. 16, 2019, now Pat. No. 10,470,483.

(60) Provisional application No. 62/677,439, filed on May 29, 2018.

(51) Int. Cl.
  *A23L 2/54* (2006.01)
  *B01F 3/04* (2006.01)
  *B67D 1/00* (2006.01)

(52) U.S. Cl.
  CPC ............ *A23L 2/54* (2013.01); *B01F 3/04787* (2013.01); *B67D 1/0058* (2013.01); *A23V 2002/00* (2013.01); *B01F 2003/04822* (2013.01); *B01F 2215/0022* (2013.01)

(58) Field of Classification Search
  CPC ... A23L 2/54; A23V 2002/00; B01F 3/04787; B01F 2003/04822; B01F 2215/0022; B67D 1/0058
  USPC .............................. 261/42, 44.1, 76, DIG. 7
  See application file for complete search history.

(56) References Cited

U.S. PATENT DOCUMENTS

| | | | | |
|---|---|---|---|---|
| 3,582,351 | A * | 6/1971 | Austin et al. | A23F 5/262 426/432 |
| 9,623,383 | B1 * | 4/2017 | Kleinrichert | A23F 5/243 |
| 9,945,299 | B2 * | 4/2018 | Lund | F02D 19/0642 |
| 10,470,483 | B1 * | 11/2019 | Lisiecki | B67D 1/0058 |
| 2013/0062366 | A1 * | 3/2013 | Tansey | B67D 1/0021 222/102 |
| 2015/0329343 | A1 * | 11/2015 | Kleinrchert | A23F 5/00 426/594 |
| 2016/0289617 | A1 * | 10/2016 | MacKenzie | B01F 15/06 |
| 2018/0236417 | A1 * | 8/2018 | Wilburn Borders | B01F 15/0261 |
| 2018/0317524 | A1 * | 11/2018 | Jennings, III | B01F 3/04808 |

(Continued)

*Primary Examiner* — Charles S Bushey

(74) *Attorney, Agent, or Firm* — Burr & Forman LLP; Jeffrey H. Kamenetsky

(57) ABSTRACT

According to one or exemplary embodiments, there is provided a Gas Infusion Module that is a compact, inexpensive, adjustable, and easy to clean apparatus for infusing a beverage, such as coffee or tea, with a gas. The Gas Infusion Module controls the mixing of the gas with a liquid beverage in a homogenization element. To achieve an enhanced homogenization of gas and liquid, first the Gas Infusion Module regulates the pressure of gas that will enter the homogenization element and mix with the liquid. Additionally, the liquid and gas mixture passes through an outlet check valve which forces greater homogenization of the aerated fluid before it is dispensed for consumption.

6 Claims, 6 Drawing Sheets

(56) References Cited

U.S. PATENT DOCUMENTS

2019/0135606 A1\* 5/2019 Perkins ................ B67D 1/0071
2020/0316534 A1\* 10/2020 Patel ................... B01F 3/04787

\* cited by examiner

GAS INFUSION MODULE

CROSS-REFERENCE TO RELATED APPLICATION

This application is a continuation of U.S. patent application Ser. No. 16/386,062, filed on Apr. 16, 2019, now, U.S. Pat. No. 10,470,483, which is a non-provisional of U.S. Patent Application No. 62/677,439, filed on May 29, 2018, the contents of which are hereby incorporated by reference.

FIELD

The present disclosure relates generally to an apparatus for infusing gas into a liquid, and more specifically to an apparatus for infusing a gas such as nitrogen, into a beverage that is suitable for drinking.

BACKGROUND

Using gas, such as nitrogen, to dispense carbonated beverages is commonly known. However, using nitrogen or other gases to infuse non-carbonated beverages such as coffee, tea, or juice is not commonly known. Infusing juice, or a chilled tea or coffee beverage with nitrogen can enhance the flavor and appearance of the beverage. According to an aspect of the present disclosure, there is provided a system that infuses a gas such as nitrogen into a beverage, such as tea, coffee, or juice.

There are a number of prior art devices that infuse a gas into a liquid. A first method uses a membrane. In the membrane, small passages with very high surface area allow gas to permeate into a liquid. This is similar to human lungs allowing gas into the bloodstream. Issues that need to be considered with this method are the saturation of the gas passages and the physical size of the module. Often, the balance of pressures & thermal variation causes an inconsistent pour.

A second method uses a porous tube. In the porous tube, pressurized gas in a chamber outside of a liquid tube is forced into the liquid within a shower of small bubbles. Issues that need to be considered with this method are the saturation of the gas passages, and the balance of pressures and thermal variation, which tend to cause an inconsistent pour. Further, while this method might work to infuse water like the Bag in Box Barista, other products such as, for example, Post-Mix Coffee, have solids in it and trying to clean it can be problematic. Since this method does not infuse the liquid enough, subsequent restriction with a tortuous path to break up the larger bubbles is required. The resulting beverage may not have the cascading effect for as long as the membrane requires.

Another prior method provides the infusion of a gas such as nitrogen where pressurized nitrogen is controlled via a pilot valve, i.e., an air-operated valve. An intermittent nitrogen pulse is injected into a liquid stream, for example, a coffee stream, within a fitting. The pulse is controlled by the exhaust of the coffee pump. The pump exhaust gas intermittently triggers the pilot valve and is then vented to the atmosphere. Issues to be considered with this approach are, for example: it is sensitive to thermal variation, which may cause an inconsistent pour; the physical size of the module; nitrogen to operate the pump is vented to atmosphere, while in all other methods, 100% of the nitrogen goes into the beverage; and this approach uses a large volume of nitrogen, therefore a larger nitrogen generator or gas bottle is required. This approach is also complex, i.e., there are moving parts that may sometimes fail, and many connections tend to leak.

In another prior art method, gas infusion incorporates the Venturi principle. In the Venturi method, a liquid passes through a choke or throat causing a pressure drop (Venturi vacuum). Gas or another liquid is drawn into the fast moving/negative pressure jet of the liquid at the choke. Then, in the turbulent expansion area downstream of the choke, further mixing of gas and liquid occurs. However, one issue to consider with this method is proper cleaning of the system through which a potable beverage will be dispensed. In a Venturi device, the expansion area where the gas and liquid homogenize must be cleaned periodically to prevent the growth of mold, mildew, and bacteria. This is typically done by running a cleaning solution through the system. But the flow of solution through a Venturi may not properly clean every internal surface and corner.

Thus, there is a need for an improved fluid and gas mixing system for potable beverages that sufficiently aerates a beverage and meets industry sanitization requirements.

SUMMARY

The present disclosure relates to an improved module for infusing gas into a beverage suited for drinking.

In one or more exemplary embodiments, a gas infusion module may include a homogenization element and a gas pressure regulator. The homogenization element may further include a chamber for mixing a gas and a liquid, a liquid inlet assembly configured to transmit the liquid into the chamber, a gas inlet assembly configured to transmit the gas into the chamber, and an outlet port configured to dispense a mixture of the gas and the liquid. The gas pressure regulator is configured to adjust an input pressure of the gas as the gas enters the homogenization element.

In one or more exemplary embodiments, the gas infusion module may include an outlet check valve at the junction between the chamber and the outlet port. The outlet check valve creates a pressure differential that increases homogenization of the liquid and the gas before the aerated beverage exits the chamber.

In one or more exemplary embodiments, the gas infusion module may include a liquid check valve at the junction between the liquid inlet assembly and the chamber. The liquid check valve prevents back flow of gas into the liquid inlet assembly.

In one or more exemplary embodiments, the gas infusion module may include a gas input valve placed directly in the flow of the passing liquid to produce small bubbles. The gas input valve prevents back flow of the liquid into the gas inlet assembly.

In one or more exemplary embodiments, a gas infusion module for mixing a gas and a liquid to create an aerated beverage is provided. The module may include a homogenization element including a chamber where the liquid and the gas are mixed to create the aerated beverage, a gas inlet port for introducing the gas to the chamber, a liquid inlet port for introducing the liquid to the chamber, and an outlet port configured to enhance homogenization of the gas and the liquid before the aerated liquid exits the chamber through the outlet port. The module also includes a gas pressure regulator for adjusting an input pressure of the gas entering the chamber.

In one or more exemplary embodiments, the gas infusion module may include an outlet check valve to enhance homogenization by breaking large gas bubbles into smaller gas bubbles as the liquid and gas are forced out of the chamber to better homogenize the mixture of gas and liquid.

In one or more exemplary embodiments, the gas infusion module may include a liquid check valve connecting the liquid inlet port and the chamber, wherein the liquid check valve allows liquid to flow in one direction from the liquid inlet port into the chamber thereby preventing back flow into the liquid inlet port.

In one or more exemplary embodiments, the gas infusion module may include a gas input valve connecting the gas inlet port and the chamber, wherein the gas input valve allows gas to flow in one direction from the gas inlet port into the chamber thereby preventing back flow into the gas inlet port.

DETAILED DESCRIPTION OF EXEMPLARY EMBODIMENTS

The present disclosure and accompanying figures presents a nitrogen infusion module that may be very compact, inexpensive, easy to adjust, can be easily cleaned without the need to dismantle, and can infuse liquid such as water or pre-mix, with gas, such as nitrogen, air, or carbon dioxide.

Figure 1:
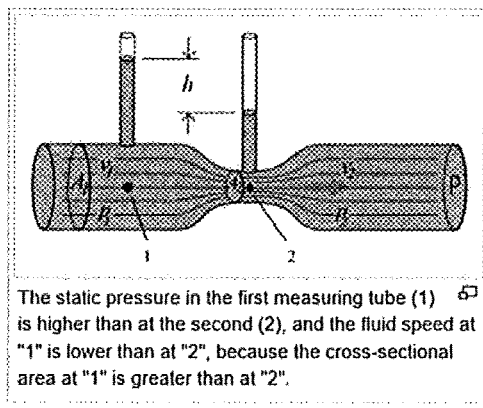
FIG. 1 illustrates the Venturi effect as known in the art.

Now turning to a discussion of the figures, FIG. 1 illustrates the Venturi effect where a fluid moving through a constricted area will result in a pressure drop that can be used to draw a second fluid into the first fluid.

Figure 2:
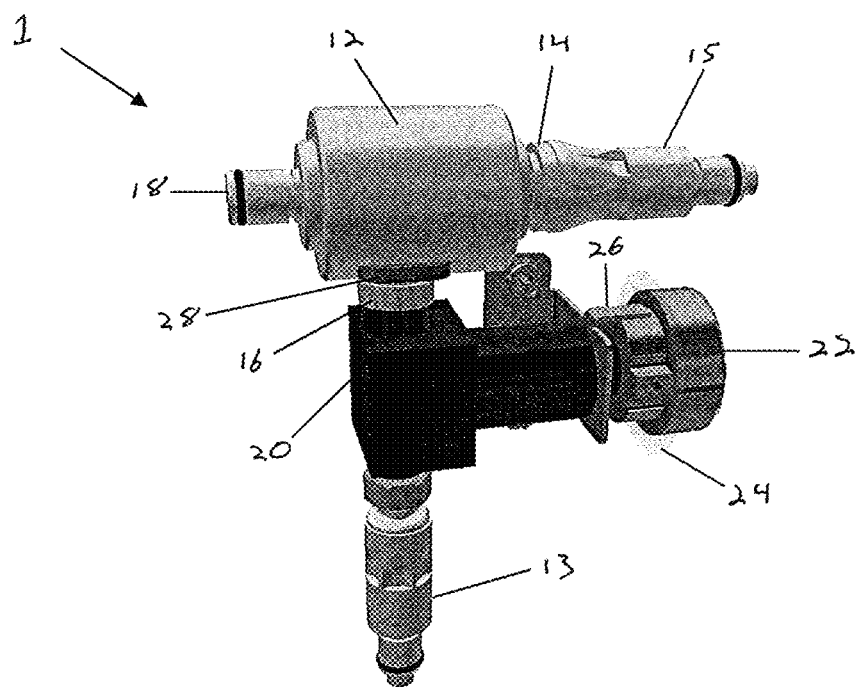
FIG. 2 illustrates the core components of the Gas Infusion Module according to an exemplary embodiment of the present disclosure.

FIG. 2 illustrates the internal components of the Gas Infusion Module according to an exemplary embodiment of the present disclosure. The Gas Infusion Module 1 includes a homogenization element 12 and a gas pressure regulator 20. The homogenization element 12 includes a liquid inlet assembly 14, a gas inlet assembly 16, and an outlet port 18. The liquid inlet assembly 14 conducts the liquid or beverage into the homogenization element 12 to mix with the gas. The gas inlet assembly 16 conducts the gas into the homogenization element 12 to mix with the liquid. After mixing in the homogenization element 12, the aerated fluid exits the Gas Infusion Module 1 through the outlet port 18. The gas pressure regulator 20 may include an adjustment knob 22, a regulated pressure graduated ring 24, and an adjustment limitation safeguard 26. The adjustment knob 22 allows a user to adjust the pressure of the gas entering the homogenization element 12. The adjustment limitation safeguard 26 provides an additional safety component by preventing the gas pressure from being raised too high. A quick release coupling 28 secures the homogenization element 12 to the gas inlet assembly 16 and allows for easy connection and disconnection of the components for cleaning. Also shown in FIG. 2 are the quick release couplings 13, 15. The quick release couplings 13, 15 allow for quick and easy connection of gas or fluid lines. It should be noted that in other embodiments, the Gas Infusion Module 1 may include fewer or more components than those depicted in FIG. 2.

In some exemplary embodiments, the liquid inlet assembly 14 includes a quick connect fitting 15 for ease of securing a fluid line to the Gas Infusion Module 1.

Figure 3:
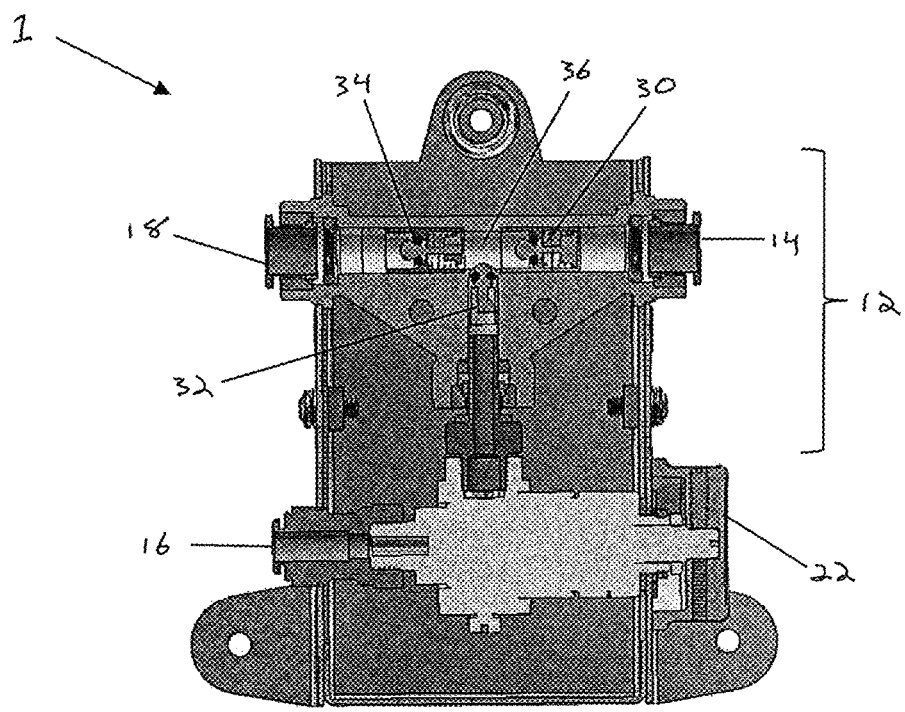
FIG. 3 illustrates a cross-sectional view of the device shown in FIG. 2.

FIG. 3 illustrates a cross-sectional view of the Gas Infusion Module 1. In this exemplary embodiment, the homogenization element 12 includes a liquid check valve 30, a gas input valve 32, and an outlet check valve 34 (collectively, "the check valves"). The liquid check valve 30 is located at the junction between the liquid inlet assembly 14 and the mixing chamber 36. The gas input valve 32 is located such that the liquid entering from the liquid inlet assembly 14 flows directly over the gas input valve 32. Finally, outlet check valve 34 is located at the junction between the mixing chamber 36 and the outlet port 18.

The check valves may only allow one-directional flow, which prevents back flow of any contaminants. The liquid check valve 30 allows liquid to flow into the mixing chamber 36 and prevents back flow into a liquid line. The gas input valve 32 allows gas to flow into the mixing chamber 36 and prevents back flow into a gas line. The liquid and gas enter the mixing chamber 36 to create an aerated liquid. The liquid and gas mixture passes through the outlet check valve 34 to exit the mixing chamber 36. Additionally, placing the gas input valve 32 in the path of flowing liquid may produce smaller bubbles in the aerated fluid. In addition, in a cleaning procedure, placing the gas input valve 32 in the path of flowing liquid may result in the gas input valve 32 being in full contact with a cleaning solution. Finally, the outlet check valve 34 creates a tortuous path and turbulence that breaks up the bubbles resulting in a more homogenized aerated fluid exiting the mixing chamber 36. The aerated fluid or beverage then proceeds out of the outlet port 18.

In addition to providing homogenization of gas and liquid, the addition of the outlet check valve 34 allows a cleaning fluid passing through the system to sanitize the entire mixing chamber 36 unlike a Venturi device, which leaves areas adjacent to the throat 30 untouched by a cleaning solution.

In some embodiments, the outlet port 18 is in fluid connection, via a hose or other suitable means, to a beverage dispensing mechanism or a beverage container (not shown).

Figure 4:
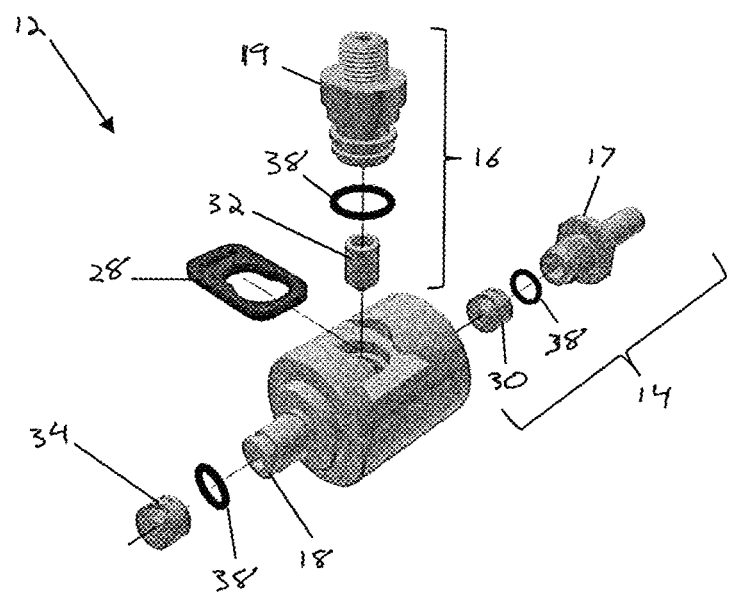
FIG. 4 illustrates an exploded view of the components of the homogenization element of the Gas Infusion Module according to an exemplary embodiment.
Figure 5:
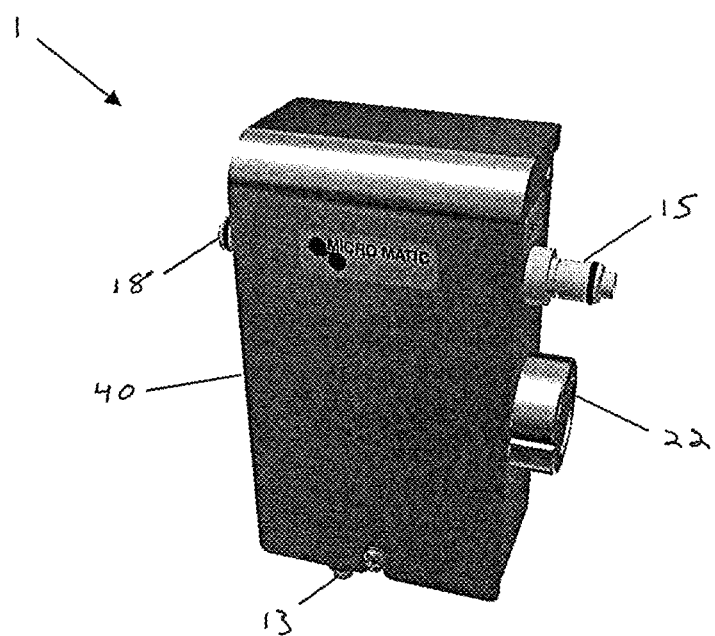
FIG. 5 is a front perspective view of the Gas Infusion Module within a removable cover according to an exemplary embodiment.

FIG. 4 illustrates an exploded view showing the components of the homogenization element 12. The homogenization element 12 includes the liquid inlet assembly 14, the gas inlet assembly 16, the outlet port 18, the check valves 30, 32, and 34, and the quick release coupling 28. The liquid inlet assembly 14 is comprised of an input fitting 17 and the liquid check valve 30. The gas inlet assembly 16 is comprised of a check port stem 19 and the gas input valve 32. A quick release coupling 28 secures the gas inlet assembly 16 to the homogenization element 12. As shown in FIG. 5, a series of O-rings 38 may be used to secure the various connections.

Figure 6:
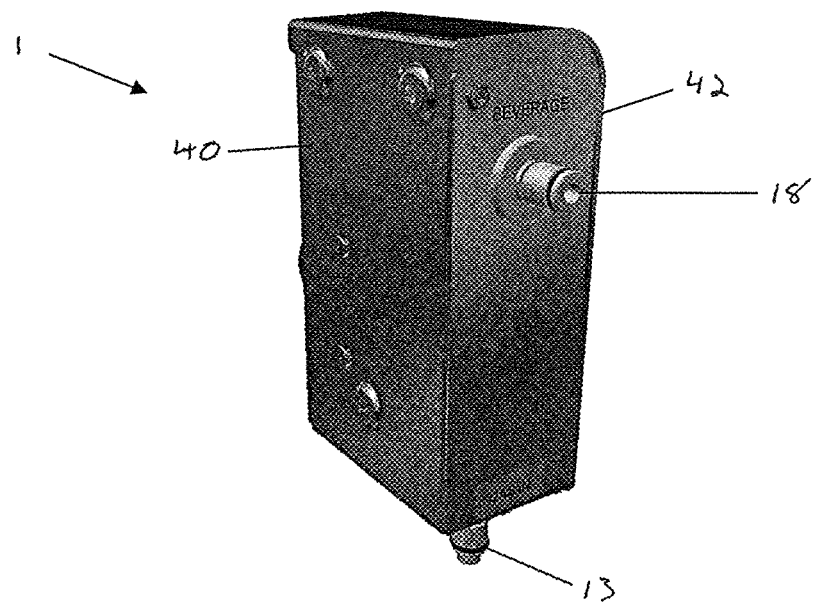
FIG. 6 is a side perspective view of the device shown in FIG. 5.
Figure 7:
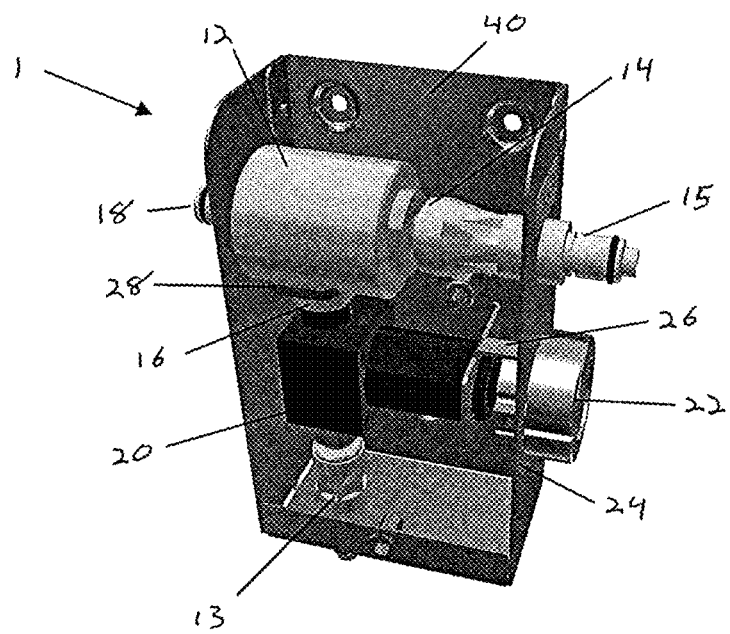
FIG. 7 is a front perspective view of the device shown in FIG. 5 without the removable cover.

FIGS. 5-7 illustrate the Gas Infusion Module 1 in accordance with an exemplary embodiment of the present disclosure. In one exemplary embodiment, the outer casing 40 is made of 20 GA #4 satin stainless steel. The Gas Infusion Module 1 includes a removable cover 42, the homogenization element 12, the gas pressure regulator 20, a gas quick connect fitting 13, and a liquid quick connect fitting 15.

Figure 8A:
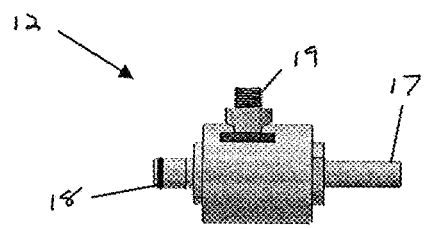
FIG. 8A illustrates a first exemplary configuration of the homogenization element.

FIG. 8A illustrates one configuration of the homogenization element 12 of the Gas Infusion Module 1 according to an exemplary embodiment of the present disclosure. In this embodiment, liquid, such as tea, coffee, juice, etc., enters the input fitting 17 at approximately 30-40 pounds per square inch (PSI). Any liquid can be used, and not only the aforementioned liquids. Further, 30-40 PSI is merely an exemplary pressure for this embodiment, and other pressures may also be used. Gas, e.g., nitrogen or air, enters the check port stem 19 and is adjustable via the pressure regulator 20 (shown for example in FIG. 8). Typical input pressure is, in one exemplary embodiment, 10 PSI. The liquid and gas meet in the mixing chamber 36 and homogenization is caused by the pressure differential created by the outlet check valve 34. Aerated fluid then flows through the outlet port 18 to a beverage container, faucet, or tap (not shown).

In some embodiments, the Gas Infusion Module 1 can be mounted within, for example, 36 inches of the faucet to avoid gas separation between pours. This distance is exemplary only, and other distances may be used.

Figure 8B:
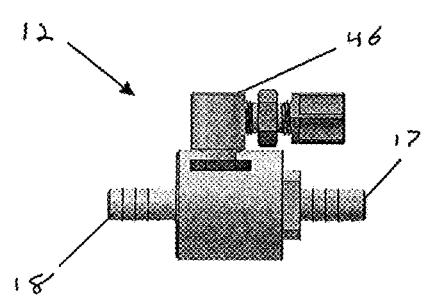
FIG. 8B illustrates a second exemplary configuration of the homogenization element with the check port stem including an extension piece.

FIG. 8B illustrates another exemplary configuration of the homogenization element 12 having an extension piece 46. In this figure, an extension piece 46 is attached to the check port stem 19 to allow different orientation of the gas entry line. In this in-line exemplary embodiment, the Gas Infusion Module 1 attaches to a beverage tube inside the tower pedestal (or leg).

Figure 8C:
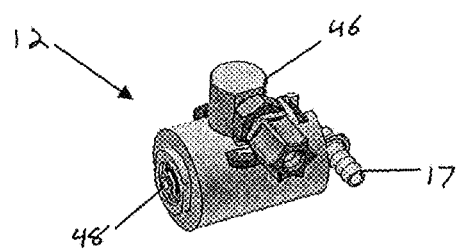
FIG. 8C illustrates a third exemplary configuration of the homogenization element with an extension piece and a shank mount.

FIG. 8C illustrates another exemplary configuration of the homogenization element 12 having an extension piece 46 and a shank mount 48. In this tower shank mount configuration, a mount is configured inside a tower (e.g., a 3 inch tower) and the shank mount 48 is connected directly to a faucet shank (not shown). In one non-limiting embodiment, the faucet shank is a Kool-rite faucet shank.

Figure 8D:
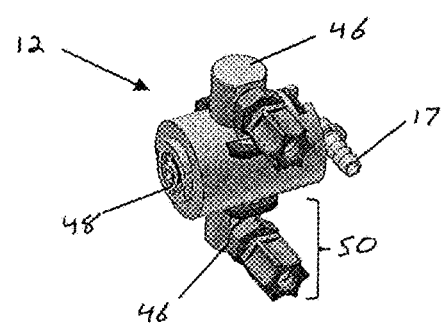
FIG. 8D illustrates a fourth exemplary configuration of the homogenization element with a syrup input assembly.

FIG. 8D illustrates another exemplary configuration of the homogenization element 12 having two extension pieces 46 and a syrup input assembly 50. In this exemplary dual input gas/syrup configuration (shown with a shank mount 48), the Gas Infusion Module 1 includes a syrup input assembly 50 where gas, a liquid, and another liquid (i.e., syrup concentrate) are injected and mixed in the homogenization element 12.

Figure 9:
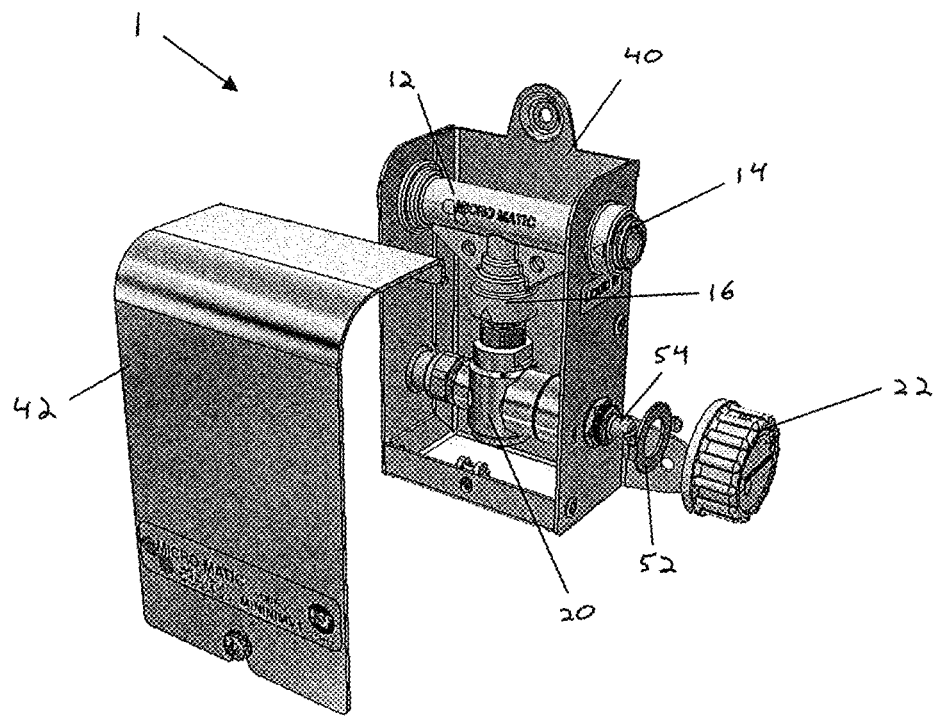
FIG. 9 illustrates another embodiment of the Gas Infusion Module with a limiting washer.

FIG. 9 illustrates an alternate embodiment of the Gas Infusion Module 1 utilizing a limiting washer 52 to prevent radical adjustments of the gas pressure by limiting the range of rotation of the adjustment knob 22. In one or more exemplary embodiments, the limiting washer 52 may be mounted behind the adjustment knob 22. This can be used, for example, as an adjustment guardrail to limit the adjustment to less than one turn so that an operator cannot make radical adjustments. The adjustment knob 22 may turn a regulator that may have several revolutions between two stops. When the adjustment knob 22 is mounted, an initial knob setting is established. In one or more exemplary embodiments, the limiting washer 52 may work in conjunction with a knob retaining screw 54 to put the ideal adjustment in the center of available rotation.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:

1. A method for mixing a gas and a liquid in a gas infusion module to create an aerated fluid, the gas infusion module including a chamber, the method comprising:
    allowing the gas to flow into the gas infusion module;
    allowing the liquid to flow over a gas input valve;
    mixing the liquid and the gas as the liquid flows over the gas input valve to create the aerated fluid; and
    allowing the aerated fluid to exit the chamber by way of an outlet port.

2. The method of claim 1, wherein an opening in the gas input valve delivers the gas flowing from a gas inlet assembly into the liquid.

3. The method of claim 1, further comprising controlling an input pressure of the gas entering the gas infusion module from a gas inlet assembly.

4. The method of claim 1, further comprising preventing, by a liquid check valve, backflow into a liquid inlet.

5. The method of claim 1, further comprising:
    allowing, by an outlet check valve, the aerated fluid to flow out of the chamber; and
    preventing, by the outlet check valve, backflow into the chamber.

6. The method of claim 5, wherein the outlet check valve is a one-way valve that breaks large gas bubbles into smaller gas bubbles as the liquid and gas are forced out of the chamber to better homogenize the aerated fluid.

* * * * *